(12) United States Patent
Jaipuria et al.

(10) Patent No.: US 7,761,383 B2
(45) Date of Patent: Jul. 20, 2010

(54) METHOD AND APPARATUS FOR OPTIMIZING NETWORKING POTENTIAL USING A SECURED SYSTEM FOR AN ONLINE COMMUNITY

(76) Inventors: Amit Jaipuria, 165, A Raj Mahal Vilas Ext., 9th Main Road, Bangalore 560 080 (IN); Pradeep Jaipuria, 165, A Raj Mahal Vilas Ext., 9th Main Road, Bangalore 560 080 (IN)

( * ) Notice: Subject to any disclaimer, the term of this patent is extended or adjusted under 35 U.S.C. 154(b) by 340 days.

(21) Appl. No.: 11/299,959

(22) Filed: Dec. 13, 2005

(65) Prior Publication Data

US 2006/0089913 A1   Apr. 27, 2006

Related U.S. Application Data

(62) Division of application No. 09/901,630, filed on Jul. 11, 2001, now Pat. No. 7,047,202.

(30) Foreign Application Priority Data

Jul. 13, 2000  (IN)  ......................... 542/MAS/2000

(51) Int. Cl.
   *G06F 21/00* (2006.01)
(52) U.S. Cl. ............... 705/57; 705/51; 705/52; 705/53; 705/54; 705/55; 705/56; 705/58; 705/59; 705/44; 705/74; 705/39; 235/380; 235/381; 235/382; 235/383
(58) Field of Classification Search ............ 705/1, 705/51–59, 39, 44, 74; 235/380–383
   See application file for complete search history.

(56) References Cited

U.S. PATENT DOCUMENTS

| | | | |
|---|---|---|---|
| 5,008,853 A | 4/1991 | Bly et al. | |
| 5,220,657 A | 6/1993 | Bly et al. | |
| 5,502,766 A | 3/1996 | Boebert et al. | |
| 5,987,440 A * | 11/1999 | O'Neil et al. | 705/44 |
| 6,073,138 A * | 6/2000 | de l'Etraz et al. | 707/104.1 |
| 6,088,717 A * | 7/2000 | Reed et al. | 709/201 |
| 6,175,831 B1 | 1/2001 | Weinreich et al. | |
| 6,236,989 B1 | 5/2001 | Mandyam et al. | |
| 6,269,369 B1 * | 7/2001 | Robertson | 707/10 |
| 6,279,112 B1 | 8/2001 | O'Toole et al. | |
| 6,493,717 B1 | 12/2002 | Junkin | |
| 6,643,650 B1 | 11/2003 | Slaughter et al. | |
| 6,745,177 B2 * | 6/2004 | Kepler et al. | 707/3 |
| 6,766,946 B2 | 7/2004 | Iida et al. | |
| 6,889,213 B1 * | 5/2005 | Douvikas et al. | 705/67 |
| 7,103,589 B1 * | 9/2006 | Kepler et al. | 707/3 |
| 2002/0055935 A1 | 5/2002 | Rosenblum | |

FOREIGN PATENT DOCUMENTS

WO    WO 00/60435    10/2000

OTHER PUBLICATIONS

Truepeers People Map page, downloaded Mar. 26, 2002 from http://www.truepeers.com/people-map.asp?sid=agizaayebtda; one page.
Beyon browsing: Shared comments, SOAPS, trails, and on-line communities, Roscheisen, Martin, Mogensen, Christian, Winograd, Terry, Computer Networks & ISDN System, Amsterdam: Apr. 1995. vol. 27, Iss. 6, p. 739.

* cited by examiner

*Primary Examiner*—Calvin Loyd Hewitt, II
*Assistant Examiner*—Cristina Owen Sherr
(74) *Attorney, Agent, or Firm*—Birch, Stewart, Kolasch & Birch, LLP

(57) ABSTRACT

The present invention provides a method and apparatus for users to search networks, both their own network and their peers' networks, all under the umbrella of a "multiple level access" security system. The present invention has been designed to optimize networking capabilities among users in a comprehensive online community. Networking among such a secured environment will allow users an opportunity to enhance their networking potential by expanding their networks to their peers' and beyond. A user registers with the online community and personally adds individuals that they know to their personal networking database. While adding these peers to the networking database, the user grants a specific level of access to each individual. This security measure is devised to discourage solicitation from other unwanted online users. The levels of access give the user an opportunity to control the amount of personal information, including contacts that they make, available to their individual peers. Based on the level of access granted by the user, the peer may or may not be able to access the user's information or the user's personal databases for potential networking. The level of access granted by two individuals need not be the same for each other.

11 Claims, 13 Drawing Sheets

Display to I

1 match found within 3 bridges (in this example)

| Industry | City | Name | Alphanumeric code |
|---|---|---|---|
| E-commerce | London | A | |
| | | ? | abc2 |
| | | ? | abc3 |

METHOD AND APPARATUS FOR OPTIMIZING NETWORKING POTENTIAL USING A SECURED SYSTEM FOR AN ONLINE COMMUNITY

CROSS-REFERENCE TO RELATED APPLICATION

This application is a divisional of U.S. patent application Ser. No. 09/901,630, filed Jul. 11, 2001 now U.S. Pat. No. 7,047,202, the entire specification claims and drawings of which are incorporated herewith by reference.

This Application claims the benefit of Provisional Patent Application No. 542/MAS/2000 filed in India on Jul. 13, 2000.

FIELD OF THE INVENTION

The present invention relates to a method and apparatus for optimizing an individual's networking capabilities by providing a secured system for organizing and processing information in a database.

BACKGROUND OF INVENTION

Personal and professional networking has traditionally entailed meeting with other individuals and exchanging business cards etc. in order to establish a personal or a business relationship. However, individuals rarely combine personal and professional networking together. By combining these resources, an individual could increase their own networking potential. Advances in technology have enhanced networking capabilities by making it easier to contact and network with another individual via systems such as electronic mail. However, with conventional systems, individuals usually do not have access to the networks of their friends and colleagues. An individual may have their own networks documented, but would rarely have access to their friends and colleagues networks. If an individual had access to the personal and professional networks of their friends and colleagues and vice versa, each would enhance the others networking potential and would open up a whole new window to personal and professional networking.

The Internet has given rise to several online communities on the World Wide Web that offer users an opportunity to network with one another. For example, U.S. Pat. No. 6,175,831 discloses a system whereby a networking database containing a plurality of records for different individuals that are connected to one another in the database by a defined relationship. Each individual define their relationship with other individuals in the database. E-mail messaging and interactive communication is utilized to establish the relationship between individuals. However, the problem with this technology is that it does not provide adequate privacy protection from undesired outside solicitations.

SUMMARY OF THE INVENTION

In a preferred embodiment, the present invention includes a method of providing a multi-level hierarchical communications network. The method includes accessing a network central database and creating a networking data set by entering information relating to multiple entities. Specific access rights of varying levels are assigned to each entity. The information is stored at the central database. The networking data set is searched to identify entities satisfying a specific criteria. The access rights assigned to the entities found in the search result are verified, the search result is displayed and the information found in the search is transmitted. The access rights convey or deny access to further database searching.

In another embodiment, the present invention further includes a method of providing a networking database. The method includes connecting to a central database and storing multiple user profiles at the central database. User access rights are assigned to each user profile. Network search fields associated with each user profile are searched for specific criteria. Information regarding user profiles related to the specific search criteria is received and subsequent network searches are performed by searching the information received to determine additional user profiles.

In another embodiment, the present invention further includes a method of searching a network database. The method includes storing information relating to individuals in a network central database and assigning access rights to the information relating to each individual. The database is searched for specific data relating to each individual. A positive search result is identified and the specific data relating to an individual is retrieved by using a multibridge linking code. The multibridge linking code grants the privilege to access further information relating to other individuals.

In yet a further embodiment, the present invention further includes a networking system having an internal interface gateway. An input/output device is in communication with the internal interface gateway. A processor is connected to the input/output device and an external interface gateway is connected to the CPU via the internal interface gateway.

In still yet another embodiment, the present invention further includes a multi-level hierarchical communications network having a network central database. The network includes a data set including information relating to multiple entities. A storing device is provided for storing the information at the database. A network interface is provided for searching the database and a user interface is in communication with the network interface.

The invention will now be described in detail with reference to the drawings.

BRIEF DESCRIPTION OF THE DRAWINGS

FIG. 9 is a diagram of the multi-bridge display.

DETAILED DESCRIPTION OF THE INVENTION

Figure 1:
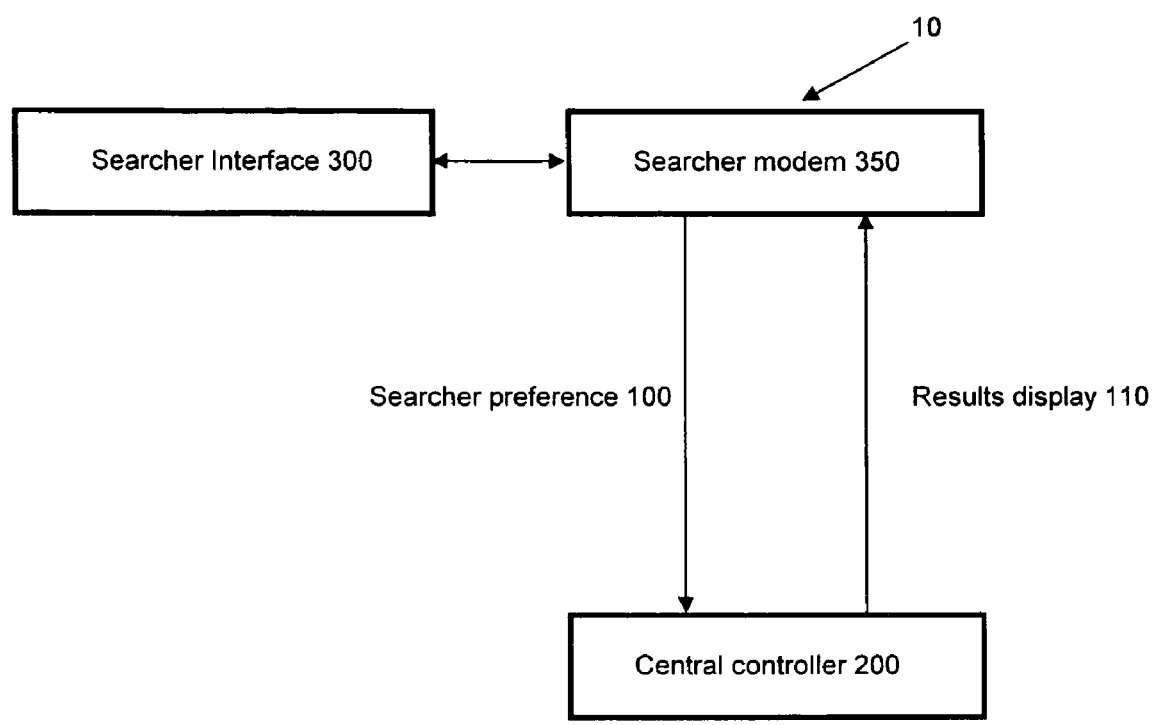
FIG. 1 is a system block diagram according to a preferred embodiment of the present invention.

The following description describes various aspects of the present invention as illustrated in the drawings. The method and apparatus of the present invention will now be discussed with reference to FIGS. 1, 2, 3 and 4. In a preferred embodiment, the present invention includes a user interface, a central controller and associated databases.

The system architecture of a preferred embodiment of the apparatus 10 is illustrated with reference to FIGS. 1, 2 and 3.

As shown in FIG. 1, the apparatus 10 of the present invention comprises searcher interface 300 and central controller 200. Central controller 200 is comprised of multiple nodes and each node is connected via an Internet connection using a communication mode such as a public switched phone network and a searcher modem 350 via a local or regional telephone operating company. Connection may also be provided via a dedicated data line, or wireless communication devices such as personal communication systems ("PCS"), microwave, or satellite networks. The searcher interface 300 is both the input and output gateway for communications with the central controller 200. These components allow the present invention to provide a method and apparatus to create a network database, post search queries, perform a search for positive matches and list the results.

To create the network database, the user logs on to the system using an identification code or user ID and a password. The identification code and user ID are fixed identity codes that enable the system to identify a user's record in the network database and facilitates the user in recalling all information pertaining to the user. Once the user is logged-on to the system, the user can add individuals to their networking database. While adding these individuals, the user grants a specific level of access or permission to each individual. This security measure is devised to discourage solicitation from other unwanted online users. The levels of access give the user an opportunity to control the amount of personal information, including contacts that they make, available to their individual peers. Based on the level of access granted by the user, the peer may or may not be able to access the user's information or the user's personal databases for potential networking. The levels of access will be explained in further detail later in the application.

As shown in FIG. 1, a user searcher provides search preference 100 to the central controller 200 via searcher interface 300 and an Internet connection. Central controller 200 receives search preference 100 from the user, performs the necessary search in central controller 200, creates a result to be displayed on results display 110 and forwards back the search results to the searcher interface 300. The searches are made with regard to the user's personal networks and are based on the level of access that the user is assigned by the user's peers. Appropriate levels of access granted to the user by the user's peer, also allow the central controller 200 to search the user's peers network when required.

Figure 2:
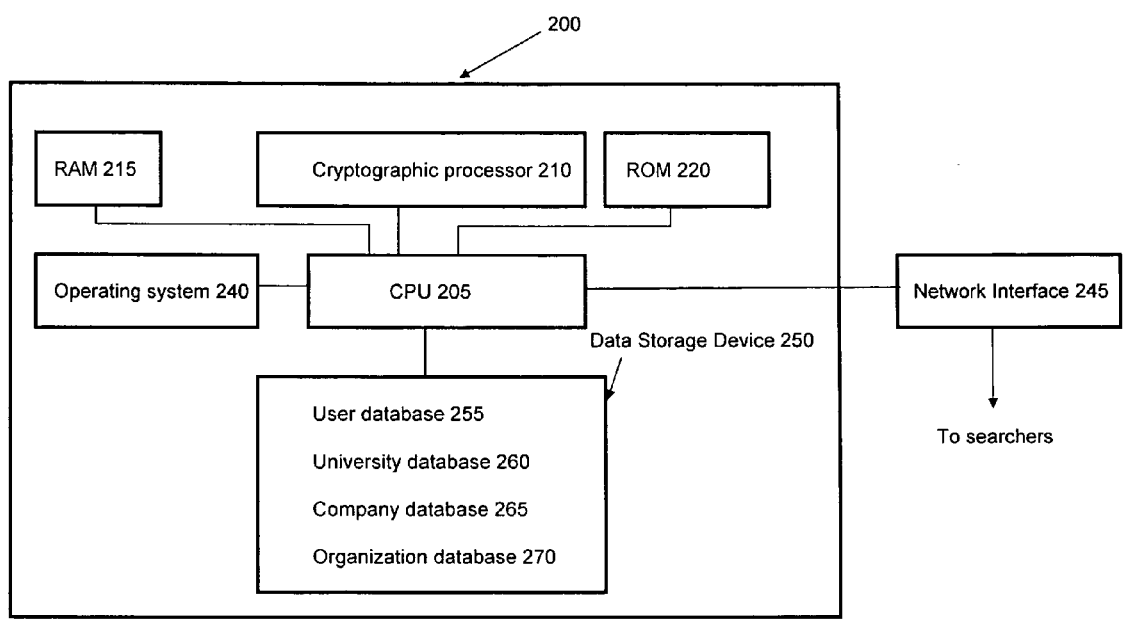
FIG. 2 is a block diagram showing an embodiment of the central controller according to a preferred embodiment of the present invention.

As shown in FIG. 2, central controller 200 includes central processor (CPU) 205, cryptographic processor 210, RAM 215, ROM 220, operating system 240, network interface 245 and data storage device 250.

A conventional personal computer or computer workstation with sufficient memory and processing capability or any other similar device may be used as central controller 200. In one embodiment the central controller 200 operate as a web server, both receiving and transmitting searches received by the searcher interface 300. Central controller 200 may be configured for high volume processing, performing a significant number of mathematical calculations in processing communications and database searches. A Pentium™ microprocessor such as the 100 MHz P54C, commonly manufactured by Intel™ Inc., may be used for CPU 205. This processor employs a 32-bit architecture. Equivalent processors such as the Motorola 120 MHz PowerPC 604 or Sun Microsystems™ 166 MHz Ultras ARC-1 or other processors are also suitable for use as the central controller 200.

A microprocessor such as a MC68HC16 microprocessor, commonly manufactured by Motorola™ Inc., may be used for cryptographic processor 210. Equivalent or superior processors developed from time to time may also be used. This microcontroller utilizes a 16-bit multiply-and-accumulate instruction in the 16 MHz configuration and requires less than one second to perform a 512-bit RSA private key operation. Cryptographic processor 210 supports the authentication of communications from users. Cryptographic processor 210 may also be configured as a part of CPU 205. Other commercially available specialized cryptographic processors include VLSI Technology's 33 MHz 6668 or Semaphore Communications' 40 Mhz Roadrunner284.

Data Storage device 250 may include hard disk magnetic or optical storage units, as well as CD-ROM drives or flash memory. Data storage device 250 contains databases used in the processing of searches used in the present invention, including user databases 255, which contain user profiles and individual user networks along with the access levels granted by the individual users to their peers. In a preferred embodiment, database software such as Oracle 7™, manufactured by Oracle™ Corporation, may be used to create and manage these databases. However other data management software such as directory servers or any other software that could support storage and retrieval of data at high speeds may be used instead.

User database 255 maintains data on users with fields such as name, address, phone number, username, electronic mail address, public/private key information, academic achievement information, personal networks and access levels to peers in the personal networks. The database is not limited to this information. This information can be obtained when the user first registers with the site or when they use the search service for the first time. The user may update this information at any time. The user will not be able to access the services of a "1-bridge" or a multi-bridge search unless the user completes the mandatory information required to complete the individual's personal profile. The fields may be configured to accept any other type of information such as hobbies, sports interests and skills.

Network interface 245 is the gateway to communicate information to and from users with the central controller 200. The network interface 245 connects the central controller 200 with the user through the searcher interface 300. Conventional internal or external modems may serve as network interface 245. Network interface 245 supports modems at a range of baud rates from 1200 upwards, but may combine such inputs into a T1 or T3 line if more bandwidth is required. In a preferred embodiment, network interface 245 is connected with the Internet and/or any of the commercial online service providers such as America Online™, CompuServe™, or Prodigy™, allowing users to access a wide range of online connections. Several commercial electronic mail servers include the above functionality. NCD™ Software manufacturers Post Office™ a secure server-based electronic mail software package designed to link people and information over enterprise networks and the Internet. The product is platform independent and utilizes open standards based on Internet protocols. Users can exchange messages with enclosures such as filed, graphics, video and audio. The system also supports multiple languages. Alternatively, network interface 245 may be configured as a voice mail interface, web site, bulletin board service (BBS), or electronic mail address.

While the above embodiment describes a single computer acting as central controller 200, those skilled in the art will realize that the functionality can be distributed over a plurality of computers. In one embodiment, central controller 200 is configured in a distributed architecture, wherein the database and processors are housed in separate units or locations. Some controllers perform the primary processing functions and contain a minimum RAM, ROM, and a general processor. Each of these controllers is attached to a WAN hub that serves as the primary communication link with the other controllers and the interface devices. The WAN hub may have minimal processing capability itself, serving primarily as a communications router. Those skilled in the art will appreciate that an almost unlimited number of controllers may be supported. This arrangement yields a more dynamic and flexible system, less prone to catastrophic hardware failures affecting the entire system.

Figure 3:
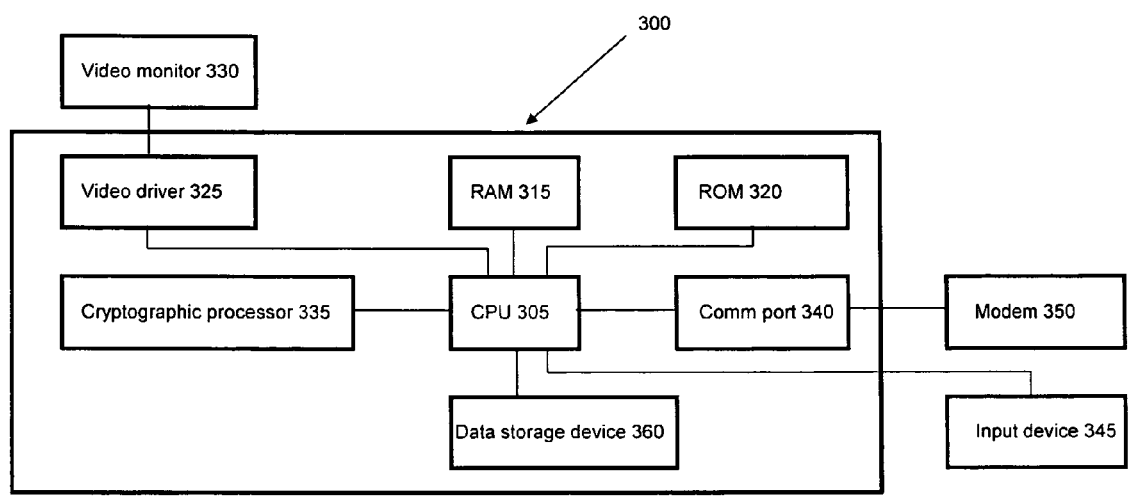
FIG. 3 is a block diagram showing an embodiment of the searcher interface according to a preferred embodiment of the present invention.

FIG. 3 describes searcher interface 300. In an exemplary embodiment, searcher interface 300 is a conventional personal computer having an input device, such as a keyboard, mouse, or conventional voice recognition software package, a display device, such as a video monitor, a processing device such as a CPU and a network interface such as a modem. These devices interface with the central controller 200. Alternatively, searcher interface 300 may also be voice mail systems, or other electronic or voice communications systems such as wireless communication devices and PDA's.

The searcher interface 300 includes central processor (CPU) 305, RAM 315, ROM 320, video driver 325, video monitor 330, communication port 340, input device 345, modem 350, and data storage device 360. Cryptographic processor 335 and biometric device 355 may be added for stronger authentication as described later. A Pentium™ microprocessor such as the 100 MHz P54C described above or equivalent may be used for CPU 305. If a cryptographic processor is required, the MC68HC 16 micro controller described above is used. Data storage device 360 is a conventional magnetic-based hard disk storage unit such as those manufactured by Conner Peripherals™.

In the preferred embodiment of the present invention, communication between the user and the central controller 200 takes place via electronic networks, with central controller 200 acting as a web server. The user logs on to central controller 200, creates search preference 100 and then enters it into the central controller 200. Central controller 200 performs the required search and creates a result to be displayed on results display 110 and forwards it to the user. The user then either logs out of the central controller 200 or instructs the central controller 200 to continue the search either by means of a new search preference 100 or a continuation of the current search preference 100.

Authentication of the user's identity involves central controller 200 extracting the user identification (user ID) from the searcher preference 100 and looking up the user's identity in the user database 255.

Figure 4A:
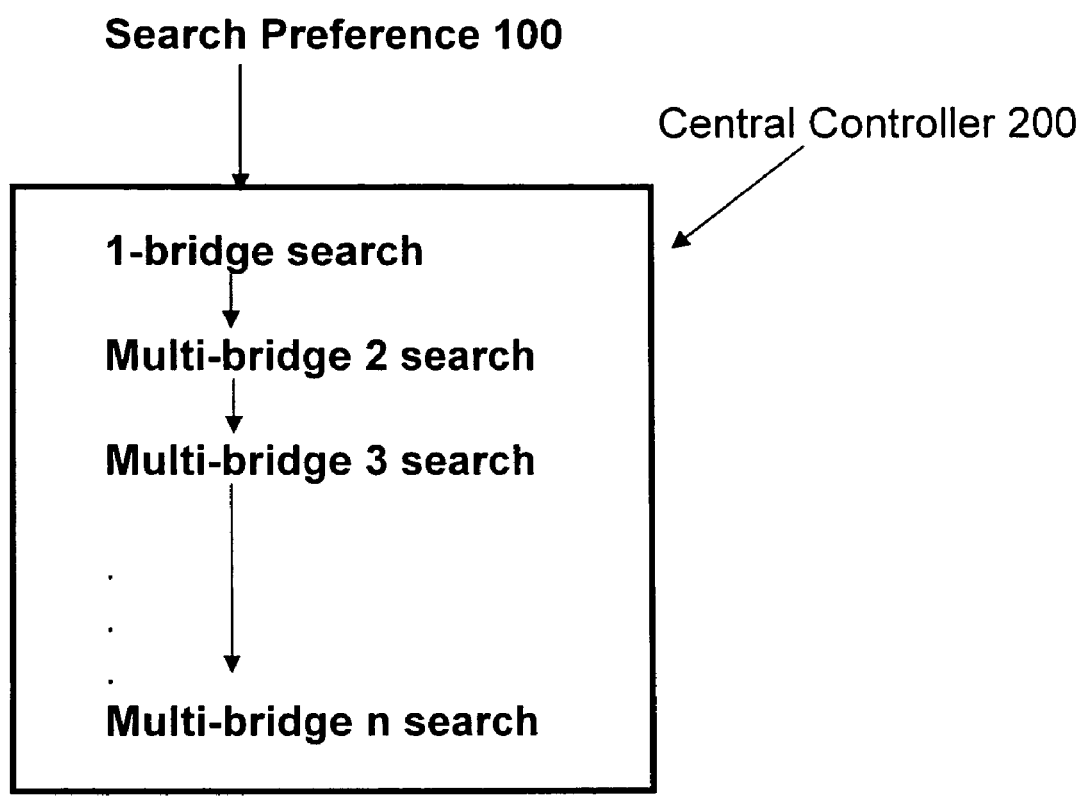
FIG. 4 is a description of a search sequence.
Figure 4B:
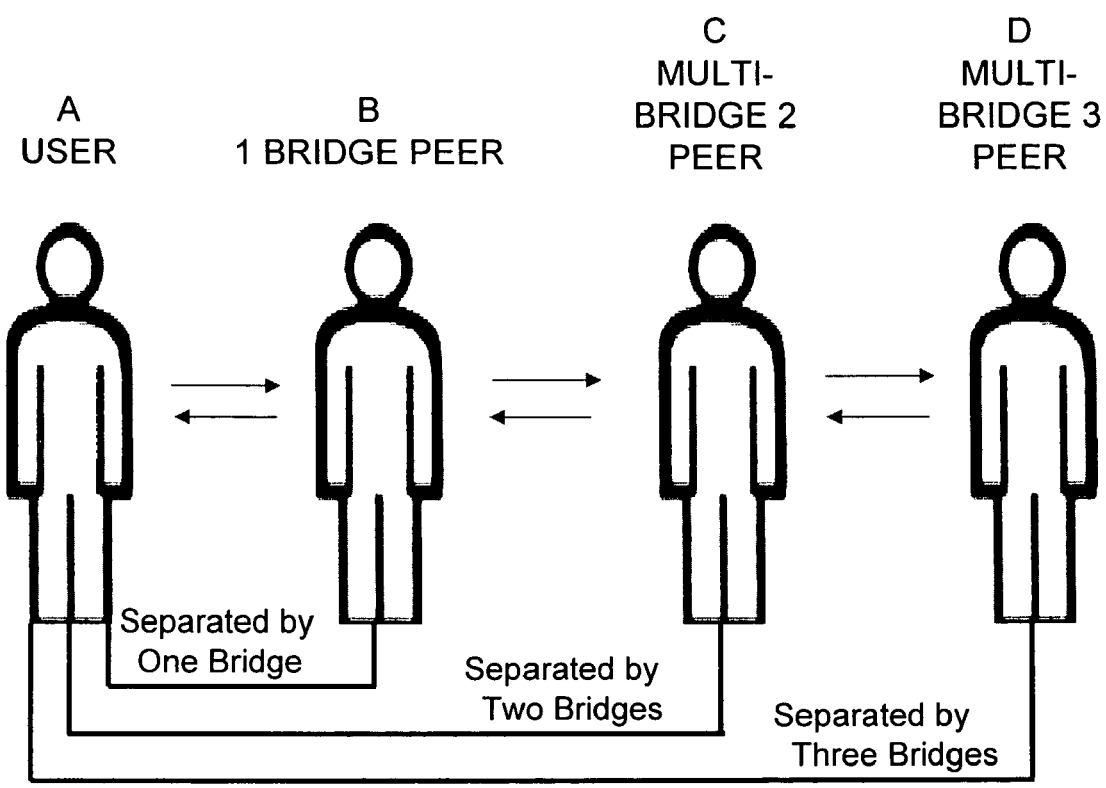

FIG. 4a describes the search sequence the central controller 200 follows for search preference 100. The central controller 200 first performs a "1-bridge" search where the controller searches the personal network of the user for any matches for search preference 100. The subsequent search is for the multi-bridge 2 searches where the central controller 200 searches the networks of the user's peers for positive matches. Following this is the multi-bridge 3 searches where the central controller 200 searches the records of the peers of those individuals that were searched in multi-bridge 2. As such, the central controller 200 searches using the sequence 1-bridge→multi-bridge 2→multi-bridge 3→multi-bridge 4→ ... →multi-bridge n ... where the controller searches the network of the peers searched in the previous multi-bridge search (n−1). In this embodiment, there are different requirements for the "1-bridge" search and the multi-bridge searches. For the "1-bridge" search, central controller 200 searches the personal contacts of those users that grant the user access to their personal and/or professional information and/or networks. However in the case of multi-bridge searches, the central controller 200 looks for two different accesses. Firstly, the users in the previous multi-bridge search grant their respective contact access to their network. Secondly, users in the current multi-bridge that have granted their respective peer access to their personal and/or professional information and/or networks. For example in FIG. 4b, consider A→B→C→D. In this example, A and B are separated by one bridge, A and C are separated by two bridges, and A and D are separated by three bridges. For an A→B, 1-bridge networking search, central controller 200 searches whether B has granted A access to their personal and/or professional information and/or networks. In the case of C→D, the central controller 200 checks first to see if C has granted B access to their network. If this requirement is met, central controller 200 then checks to see if D has granted C access to their personal and/or private information and/or networks. Only if both these criteria are met does the central controller 200 perform the search on D's information. The 1-bridge and multi-bridge searches are explained in detail in the following pages.

Figure 5A:
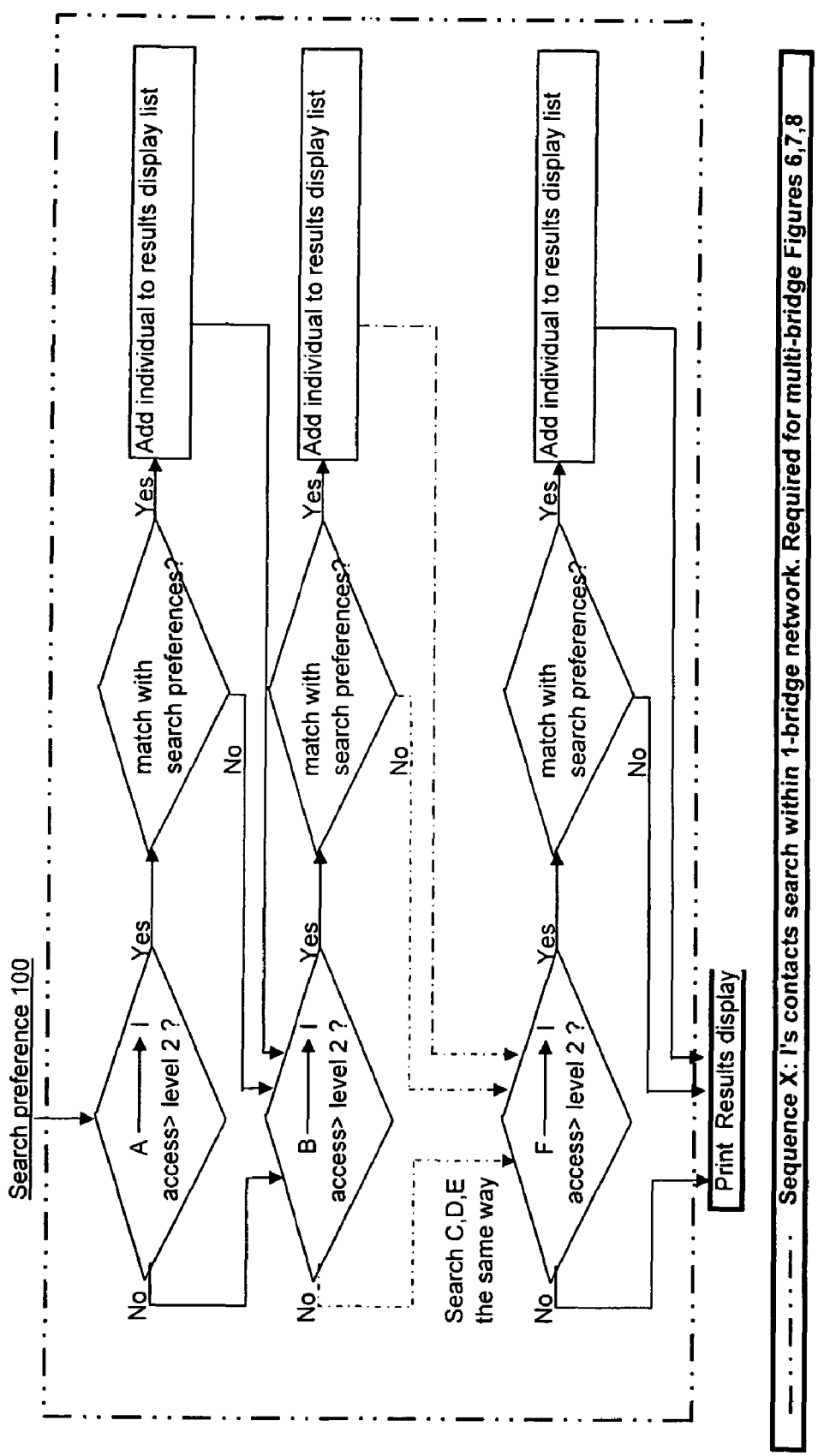
FIGS. 5a and 5b are diagrams illustrating a 1-bridge search.
Figure 5B:
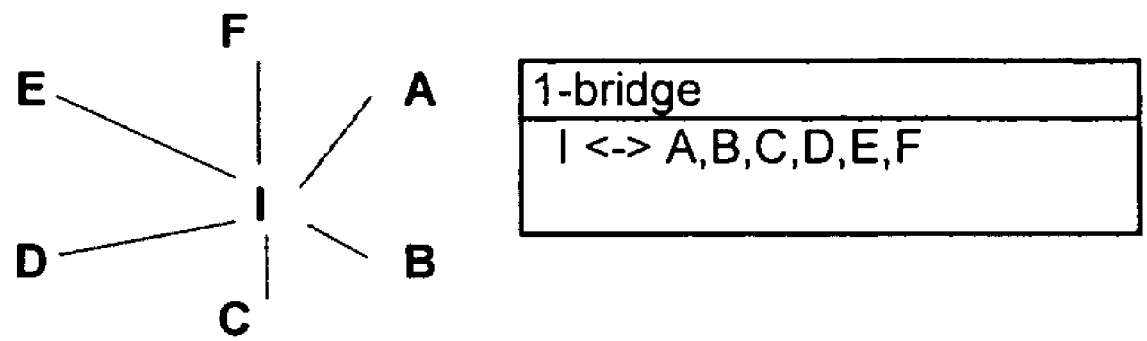

FIGS. 5a and 5b describe the process the central controller 200 follows to perform a general 1-bridge search. The following example illustrates the five levels of access security that users can grant their peers. Summaries of the levels are as outlined below.

Level 1: Public information (First name, Last name, Date of birth, City, State and Country of residence, masked e-mail, Academic life summary including schools and colleges+degrees).

Level 2: Semi-public information (Level 1+Name and Contacts of businesses personally involved with present and past): User chooses to provide access to one's own professional information.

Level 3: Multi-tier public information (Level 2+Multi-bridge networking option): User chooses to provide access to one's own professional information and one's network.

Level 4: Semi-private information (Level 2+access to complete personal information): User chooses to provide access to one's own personal and professional information.

Level 5: Total information (Level 4+multi-bridge networking option): User chooses to provide access to one's own personal and professional information including one's network.

Level 1 is the extent of information of online users available to the general public using the system. Potential benefits of networking would lie in Levels 2 through 5. Another online user would not have any incentive to misuse the system using just a Level 1 access.

The level of access granted by a user to a peer is the extent to which the peer can access the user's information or network. For example, if the user chose to grant his peer a Level 1 access, then the peer would not have access to the users professional information or the user's networks.

If the user grants Level 2 access to his peer, the peer would only have access to the user's professional information, which would include the user's job profile along with the user's history of employment. The peer would not have access to the user's personal information such as family members, hobbies, etc.

If the user grants his peer a Level 3 access, then the peer would have access to the user's networks and information available through a Level 2 authorization.

If the user grants Level 4 access to his peer, in addition to the information provided with a Level 2 access, the peer would have available to him the user's personal information including family, hobbies, etc.

Finally, if the user grants his peer a Level 5 access, the peer would have access to the user's networks and information available through a Level 4 authorization.

In a preferred embodiment of the invention, the user connects with the central controller 200 via an electronic network and logs on using the "userID" and "password". The central controller 200 contains the database that stores user profiles along with individual network databases that have the individual access levels granted to peers by users. The user enters data in one or more network search fields based on the user's choice, for example company name, industry, department, etc. The present invention does not limit what information the user may search for in the network search fields. The present invention may also be configured to search for information such as hobbies, sports activities, professional interests, etc. The central controller 200 receives the input data and pulls up the user's personal network database from the user databases stored in the central controller. The central controller 200 begins the search process by using the user's personal network. In the first step, the central controller 200 searches those individuals in the user's network that have given the user access to their personal information and/or networks. This is called a "1-bridge" search and the individuals whose information is searched are "1-bridge users." As shown in FIGS. 5a and 5b, to further exemplify, consider user "I" with a network of "A", "B", "C", "D", and "E" all of which have granted permission to "I" to view their personal and/or professional information (Level 2 and above access). Another individual "F" who is also in "I's" network has not granted "I" access to his personal and professional information and/or networks. In the case of a 1-bridge search, central controller 200 will search the personal and professional information of "A", "B", "C", "D", and "E" (1-bridge users) for matches to search preference 100. However, the central controller 200 will not search the information of "F" since the appropriate access was not granted to "1." If a positive match is found, central controller 200 creates a result to be displayed on results display 110 and forwards it to searcher interface 300. The user can then choose to either log out of the central controller 200 or continue the search into the multi-bridges. If no matches were found in 1-bridge search, the central controller 200 continues into a multi-bridge search.

Figure 6A:
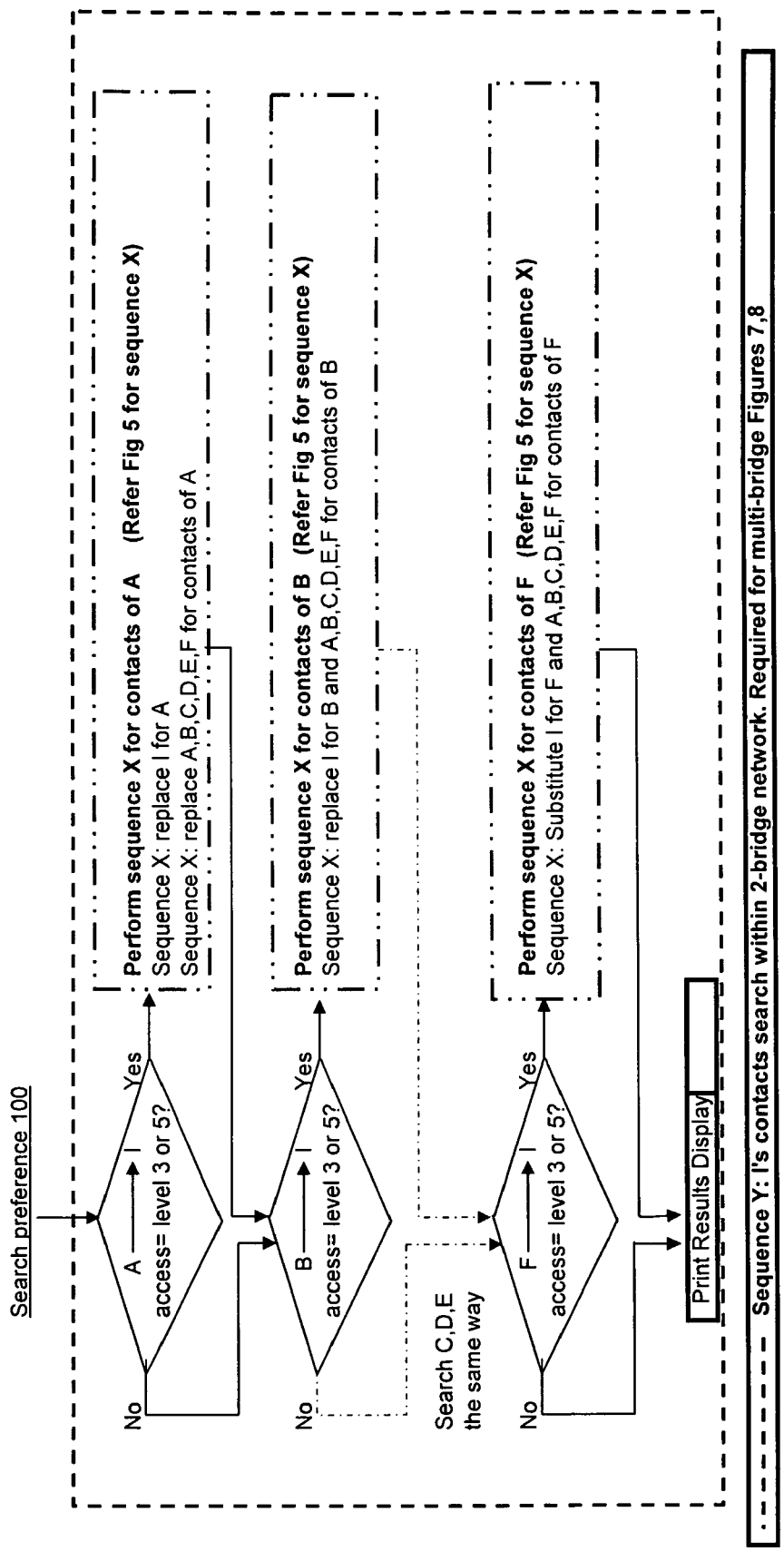
FIGS. 6a, 6b, 7a, 7b, 8 and 9 are diagrams illustrating multi-bridge searches.
Figure 6B:
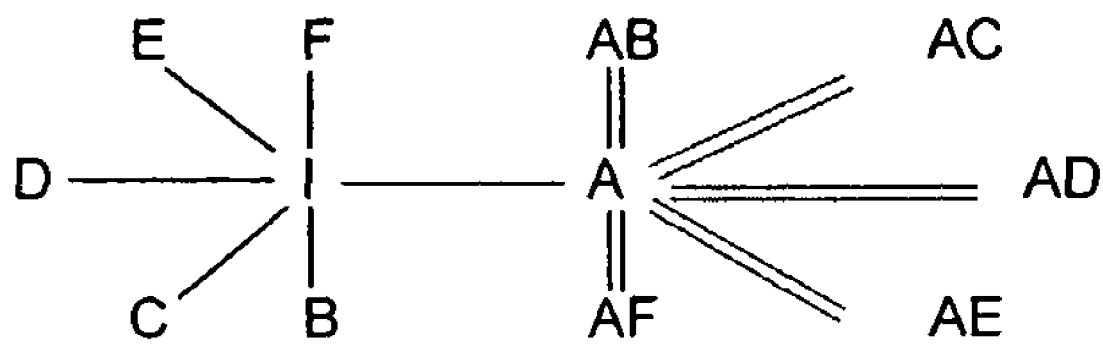

FIGS. 6a and 6b describe a "multi-bridge 2" search or "MB2." As mentioned above, for a multi-bridge 2 search to take place, two criteria need to be met for every user before a search takes place. First, the 1-bridge users should have granted the user access to their networks. And secondly, peers of these users should have given them appropriate level of access to their information and/or networks. This example uses the five levels of access security that users can grant their peers. Summaries of the levels are again provided below.

Level 1: Public info (First name, Last name, Date of birth, City, State and Country of residence, masked e-mail, Academic life summary including schools and colleges+degrees).

Level 2: Level 1+Access to user's professional information (including history of employment)

Level 3: Level 2+access to user's networks.

Level 4: Level 2+access to user's private info (including family, hobbies, etc.)

Level 5: Level 4+access to user's networks.

The "1-bridge" search and FIGS. 5a and 5b will be used in further illustration to explain the process of the multi-bridge search. Assume the sequence of flow of search in FIGS. 5a and 5b is Sequence X. The central controller 200 searches the personal network of the user "I" and checks for individuals that have granted user "I" access to their respective networks. The central controller 200 then searches these users networks for individuals that have granted them access to their personal and/or professional information and/or networks. These individuals are multi-bridge 2 users. The central controller 200 then performs a 1-bridge search of the information of the "multi-bridge 2" users for a match to search preference 100. To further exemplify, assume in the example above that "A" (1-bridge user) provided access to the user to search his network with regard to the fields entered in search preference 100 (Level 3 or Level 5). Further assume that "AB", "AC", "AD", "AE" and "AF" are peers of user "A" and have granted him access to their information and/or networks (Level 2 and above). As such, "AB", "AC", "AD", "AE" and "AF" become MB2 users. The central controller 200 performs a "1-bridge" search on "AB", "AC", "AD", "AE" and "AF" for a positive match for search preference 100, forwards the results to result display 110, and if required to searcher interface 300.

FIGS. 6a and 6b illustrate user "I's" search within a multi-bridge 2 network. Consider for example "Perform sequence X for contacts of A." "Contacts of A" are MB2 users connected to A—in this case "AB", "AC", "AD", "AE" and "AF". This is a multi-bridge 2 search because there are two bridges involved in the network, one from the user "I" to "A" and the other from "A" to "AB", "AC", AD", "AE' and "AF" respectively. If no search is made in multi-bridge 2, the central controller 200 can automatically move on to a multi-bridge 3 search.

Figure 7A:
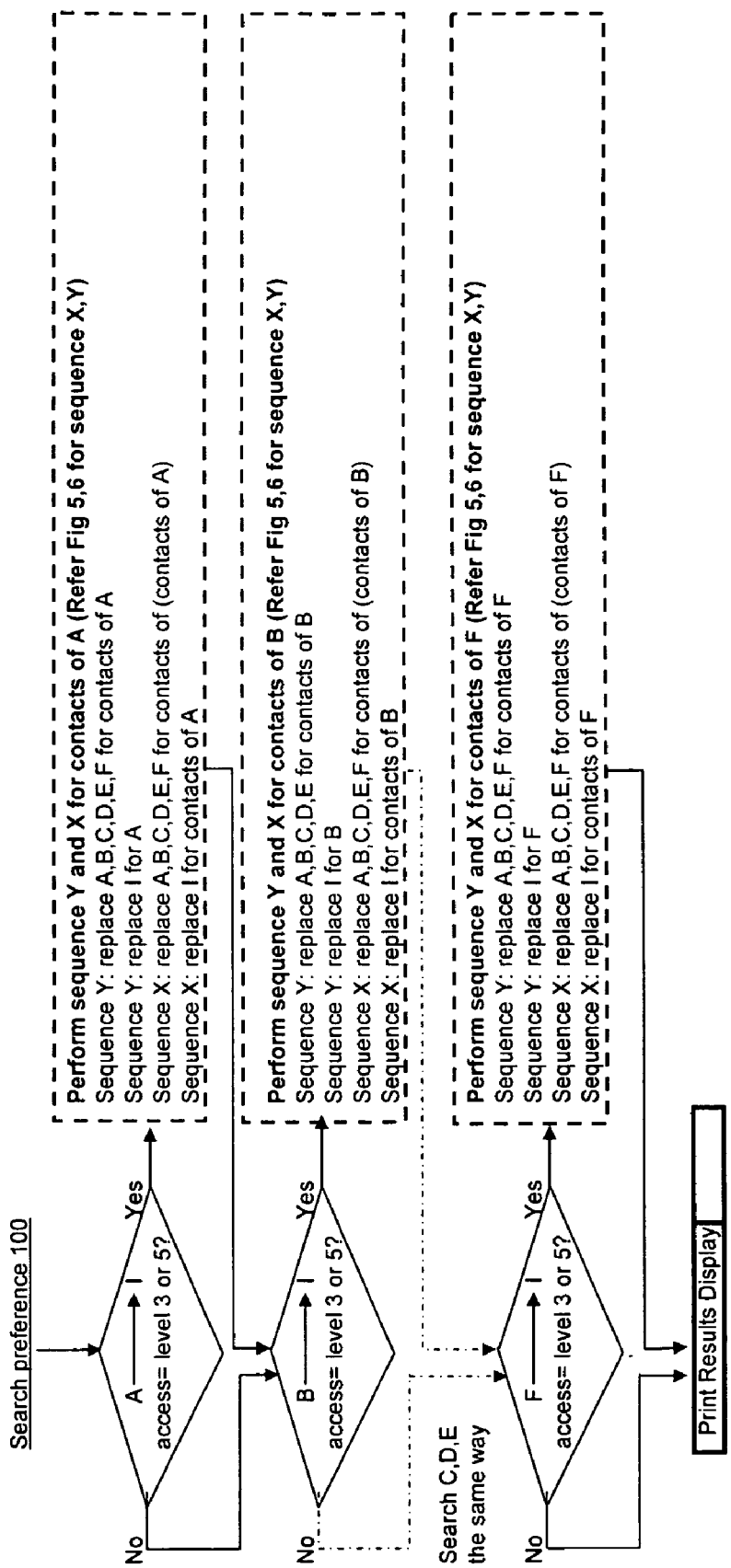
Figure 7B:
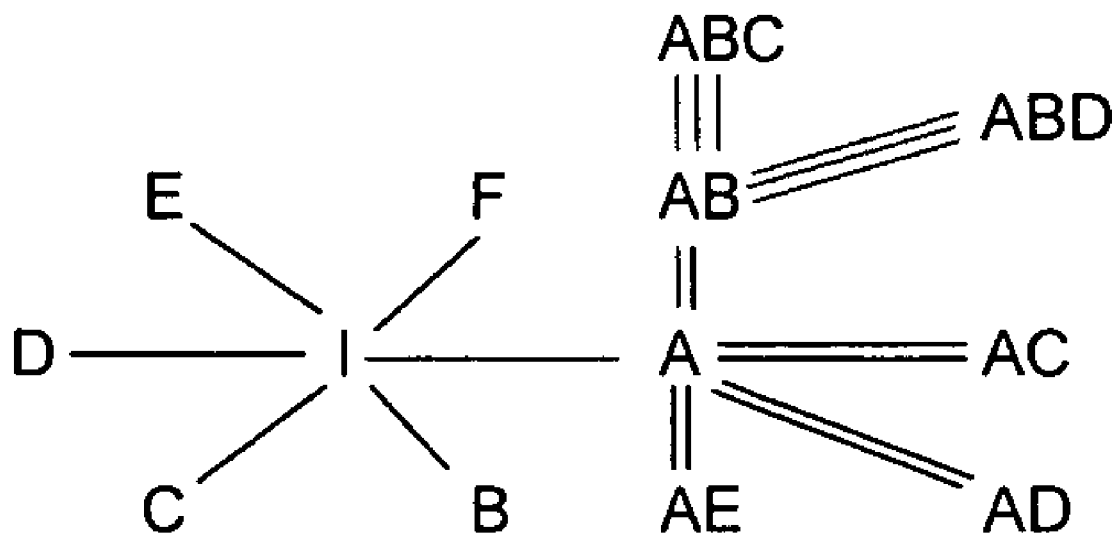

FIGS. 7a and 7b describe a "multi-bridge 3" search or "MB3." This example uses the five levels of access security that users grant their peers. Summaries of the levels are again as outlined below.

Level 1: Public info (First name, Last name, Date of birth, City, State and Country of residence, masked e-mail, Academic life summary including schools and colleges+degrees).

Level 2: Level 1+Access to user's professional information (including history of employment)

Level 3: Level 2+access to user's networks.

Level 4: Level 2+access to user's private info (including family, hobbies, etc.)

Level 5: Level 4+access to user's networks.

Assume the sequence of flow of search in FIG. 6 as Sequence Y. The central controller 200 first searches the information of the "MB2 users" searched to check if they have provided their respective "1-bridge user" with access to their respective networks. If so, the central controller 200 then searches the personal networks of these users for individuals that have granted these "MB2 users" access to their information and/or networks. These individuals are "multi-bridge 3" users. The central controller 200 then searches the personal and professional information of the multi-bridge 3 users for search preference 100 and forwards any matches to searcher interface 300, customized according to multi-bridge result display 110 as is described later. To further illustrate, using the example from the multi-bridge 2 search, assume that "AB" (MB2 user) has granted "A" (1-bridge user) access to their networks (Level 3 or 5) and "ABC" and "ABD" are peers of "AB" that have granted them access to their information and/or networks (Level 2 and above). The central controller 200 searches the personal information of "ABC" and "ABD," who are MB3 users, and forwards the result to results display 110. If there are no results the central controller 200 continues on to the next multi-bridge search.

As shown in FIGS. 7a and 7b, there are instances where an MB2 Sequence Y search needs to be performed. For example, consider "Perform Sequence Y and X for contacts of A." in this example, substitute in Sequence Y, A, B, C, D, E for contacts of A which in this instance would be "AB", "AC", "AD", "AE" and "AF." Again in Sequence Y, substitute I for A. Further in Sequence X, substitute A, B, C, D, E and F for contacts of A. Contacts of A are MB3 users connected through A—in this instance ABC and ABD. In Sequence X, substitute I for contacts of A—in this instance AB, AC, AD and AE. Results of matches will be added to multi-bridge results display 110.

Figure 8:
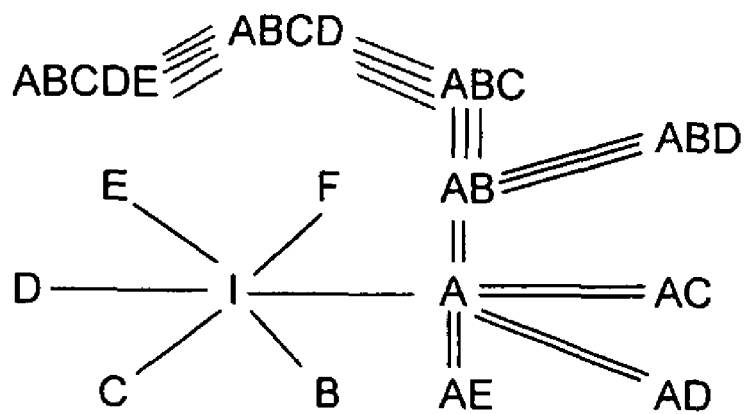

As described in FIG. 6 and FIG. 7, the multi-bridge search can extend to as many bridges as required (MB (n). As shown in FIG. 8, for an MB (n) search to take place two criteria need to be met:

1. All users that were searched in MB (n−1) should have granted their respective MB (n−2) users access to their networks (Level 3 or 5)

2. Information of only those individuals of MB (n) is searched who have granted permission to their respective MB (n−1) user access to their personal and/or professional information and/or networks. (Level 2 and above)

For an MB (n) search to take place the central controller 200 performs the search if two criteria are met:

1. All MB (n−1) users that are searched have given their previous links in the network access to their contacts e.g. in FIG. 8, ABCD is a previous link of ABCDE, ABC is a previous link of ABCD, AB is a previous link of ABC, A is a previous link of AB and I is a previous link of A.

2. All MB (n) users that are searched grant their previous link MB (n−1) user permission to their information and/or networks.

The central controller 200 searches the personal and/or professional information of these MB (n) users for matches to search preference 100 and provides the results to the results display 110 and to searcher interface 300.

Referring again to FIG. 8, consider a multi-bridge search for ABCDE by I that involves 5 bridges. In this case n=5 and (n−1)=4. The five level access security system is again used. Summaries of the levels are again as outlined below.

Level 1: Public info (First name, Last name, Date of birth, City, State and Country of residence, masked e-mail, Academic life summary including schools and colleges+degrees).

Level 2: Level 1+Access to user's professional information (including history of employment)

Level 3: Level 2+access to user's networks.

Level 4: Level 2+access to user's private info (including family, hobbies, etc.)

Level 5: Level 4+access to user's networks.

According to the rules stated above, the central controller 200 checks to see if the users in MB (4) have granted their previous link access to their contacts (in this example, level 3 or level 5). So, the central controller 200 checks to verify the following network accesses.

Multi-bridge 4 ABCD→Multi-bridge 3 ABC (level 3 or 5?)
Multi-bridge 3 ABC→Multi-bridge 2 AB (level 3 or 5?)
Multi-bridge 2 AB→1-bridge A (level 3 or 5?)
1-bridge A→user I (level 3 or 5?)

If the above are met, the central controller 200 verifies if multi-bridge 5 ABCDE has granted permission to multi-bridge 4 ABCD to access their personal information and/or networks.

ABCDE→ABCD (level 2 and above)

If all the above criteria are met, the central controller 200 searches ABCDE's information based on search preference 100.

Figure 9:
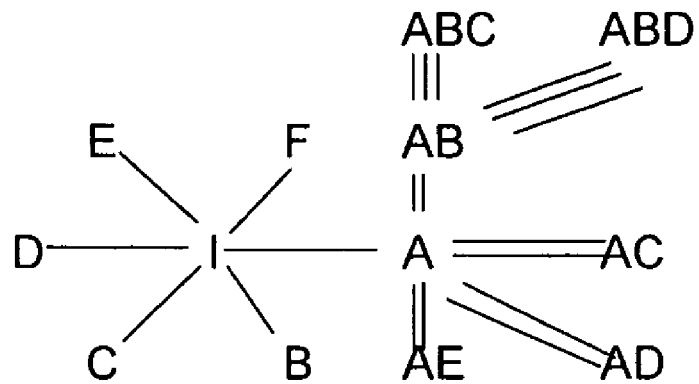

Turning now to FIG. 9, one example of the multi-bridge results display 110 will be described. To discourage searchers from exploiting the services offered by the multi-bridge search, the search results are restricted to a particular format. The results display 110 neither displays the name of the targeted individual, nor the names of the network of bridges that the user will need to go through to make the network. Instead the results display 110 can display the number of bridges that the user needs to use for the network. The results display 110 also displays a unique multi-bridge code that represents the link between the different individuals involved in the network. The multi-bridge code is used to facilitate the individuals forming the network in identifying the next bridge in the network and in gaining permission to contact the respective individual. The multi-bridge code is a unique string that is randomly assigned by central controller 200 to a user if the user is a part of a multi-bridge search result beyond the initial 1-bridge search. The multi-bridge code is used to protect user's privacy and to provide network security. The multi-bridge code may be alphanumeric, icons, symbols or any other unique string. Using the alphanumeric code by way of example only, positive matches for the alphanumeric code only occur if the individual is on the personal network list of the user making the search. In FIG. 9, if the search preference is for example, "industry=e-commerce" and "city=London" and a match results for the multi-bridge 3 network search "I"→"A"→"AB"→"ABC," the display to the user includes all information that was searched for by the user including the number of bridges (e-commerce, London and three bridges), the identity of personal contact 'A', and two alphanumeric codes (assume abc2, abc3). These alphanumeric codes are assigned only for the bridges that lead to a match for search preference 100 during the search. The result will not provide any information to the user that would help identify "AB" or "ABC" in this case. The method of the present invention requires the user to contact "A" to identify "AB" and then request "A" to request "AB" to contact "ABC". Searches made by the user for abc2 and abc3 will lead to no results. The user will need to provide the codes abc2 and abc3 to "A" so that "A" could gain permission to access "AB". "A" will find a positive match for abc2, but no match for abc3. "A" will need to contact "AB" and provide "AB" with abc3. "AB" will find "ABC" by entering abc3 in his network search field. "AB" would then need to get "ABC" to get in touch with either the user directly or via the individual bridges.

Users can contact each other by any known communications methods such as by telephone, e-mail, regular mail or via internet. Also, in a further embodiment, once a positive search result is achieved, the present invention may be configured such that if the user wants to contact "ABC" in the previous example, the contact message can be auto forwarded from "A" to "AB" and finally to "ABC."

In yet another embodiment of the multi-bridge result display 110, central controller 200 provides results display 110 with time-bound alphanumeric codes for the individuals forming the bridges. The central controller 200 randomly assigns a unique alphanumeric code for two individuals forming a bridge (assume User→"A"→"AB"→"ABC") that is only active for a specific time period such as one or two weeks. This is more valuable over a permanent alphanumeric code assigned for every individual since it would further protect the accounts and privacy of every individual. By using time-bound codes, this ensures that some miscreant user cannot keep a record of the alphanumeric codes and publish them online. For example, if the user does not contact ABC within two weeks, the alphanumeric codes would expire and the user would have to perform the search again to receive new time-bound alphanumeric codes and provide them through the bridges. The user id from the search is not used because the user id may reveal the individuals names and may become the reason for solicitation.

In another embodiment of the multi-bridge result display 110, those skilled in art will appreciate that the present invention may also be configured to forward a string that represents a unique "key" that contains all the alphanumeric codes assigned to a successful multi-bridge network search. The key could be alphanumeric, symbols, icons or any other graphical representation. The key could also be time-bound. The key maybe configured to be passed between the users in a network where each user uses the key to unlock the identity of their subsequent contact. The user can then decide to forward the key to the subsequent contact to continue the network or stop the process by not forwarding the key. This embodiment of the present invention also ensures that each user is revealed only the identity of a known contact of the subsequent bridge and no one else. This also allows the user to disallow forwarding of the key if the user chooses to in order to protect their privacy and security.

There are many ways to build the networking database. For example, one first way is through individual field searches where field names are entered such as, first and last name or e-mail identification in order to receive all users that find positive matches. The user may then select the person that they wish to add. Alternatively, the user can add groups of peers through organization directories. The present invention also allows users to add themselves to the respective organization directories that they represent such as college, etc. The user may then access these directories and can add individuals to their list at the same time rather then individually adding them using e-mail or name, etc. Once a user adds a name, the individual will be notified the next time they log in. A link will allow the individual to see who has added them so that the user can be added to their network if desired. Although only one user database has been exemplified throughout the application, those skilled in the art will realize that there may be multiple users who each may build their own networking database.

The present invention is applicable to individuals as well as entities such as a corporation. For example, a company is categorized by industry, geographic location, products, services, brands or expertise that they have. This helps competitors to differentiate one another within categories and also helps the user target the right companies to do business with. Companies are assigned identifiers such as keywords that represent their business. These keywords are used by users to locate a particular business. For example, the keywords could be anything from geographic location to products and services, to brands and even expertise. The user can search for a combination of one or more of these keywords and obtain target results of companies that can meet the user's requirements.

Once the searcher has targeted a company using the keyword search, the system also allows the user to perform a 1-bridge and a multi-bridge search as described herein to connect to an individual within that particular organization.

The five level access security system has been used throughout this document to illustrate examples and facilitate understanding the need for and uniqueness of the invention. While the above embodiment describes five levels of access to address the security of the system, those skilled in the art will realize that the functionality of the security system could be distributed over as many levels of access as required. Multiple levels of access will yield a more dynamic and flexible system, less prone to constraints in awarding access rights to user information and networks among online users.

It is to be further noted that within the scope of the invention various modifications and amendments are permissible.

What is claimed is:

1. A computer-implemented method of social networking with contacts of people within groups or companies comprising the steps of:

storing, on a server, a social network database comprised of different companies and/or groups to facilitate social networking;

geographically segmenting, by a server controller at the social network database, the companies and/or groups;

categorizing, by the server controller at the social network database, the companies and/or groups by industry;

categorizing, by the server controller at the social network database, the companies and/or groups by services provided;

categorizing, by the server controller at the social network database, the companies and/or groups by products made;

categorizing, by the server controller at the social network database, the companies and/or groups by expertise;

assigning, by the server controller at the social network database, one or more keywords to each category;

searching by the server controller the social network database using the one or more keywords for one or more companies and/or groups having criteria matching a specific requirement;

further searching by the server controller the social network database to identify one or more contacts, in the social network database, associated with the companies and/or groups found in a search result, wherein the one or more contacts are associated with the searcher;

creating, by the server controller, a hierarchical chain between a searcher and each contact found during the search;

assigning, by the server controller, a multibridge linking code to each link in the hierarchical chain between the server and each contact found during the search a the social network database that has criteria matching the specific data requirement;

creating, by the server controller, a key comprising all of the multibridge linking codes that have been assigned during the search;

passing, by the server controller, the key to a computing device of at least one of the contacts in the hierarchical chain;

determining, by a controller of the computing device of the at least one contact, whether to forward the key to a computing device of a next sequential contact in the hierarchical chain based on an indication to forward the key received by the controller of the computing device from the contact; and forwarding, by the controller, the key to the computing device of the next sequential contact in the hierarchical chain based on the determination to forward the key.

2. A computer-implemented method of social networking with contacts of people within groups or companies comprising the steps of:

storing on a server a social network database comprised of at least one of different companies or groups to facilitate social networking;

geographically, by a server controller at the social network database, segmenting the at least one company or group;

categorizing, by the server controller at the social network database, the at least one company or group by industry;

categorizing, by the server controller at the social network database, the at least one company or group by services provided;

categorizing, by the server controller at the social network database, the at least one company or group by products made;

categorizing, by the server controller at the social network database, the at least one company or group by expertise;

assigning, by the server controller at the social network database, one or more keywords to each category;

searching by the server controller the social network database using the one or more keywords for one or more companies or groups having criteria matching a specific requirement;

further searching by the server controller the social network database to identify one or more contacts, in the social network database, associated with the companies or groups found in a search result, wherein the one or more contacts are associated with the searcher;

creating, by the server controller, a hierarchical chain between a searcher and each contact found during the search;

assigning, by the server controller, a multibridge linking code to each link in the hierarchical chain between the searcher and each contact found during the search that has criteria matching the specific data requirement;

creating, by the server controller, a key comprising all of the multibridge linking codes that have been assigned during the search;

passing, by the server controller, the key to a computing device of at least one of the contacts in the hierarchical chain;

determining, by a controller of the computing device of the at least one contact, whether to forward the key to a computing device of a next sequential contact in the hierarchical chain based on an indication to forward the key by the controller of the computing device from the contact; and forwarding, by the controller, the key to the computing device of the next sequential contact in the hierarchical chain based on the determination to forward the key.

3. The method of claim 1, wherein each contact in the hierarchical chain conveys or denies access to their information by not providing an indication to forward the key to contact a subsequent contact.

4. The method of claim 1, wherein the key is time-bound.

5. The method of claim 1, wherein the key is at least one of alphanumeric, symbols and icons.

6. The method of claim 1, wherein the key is randomly assigned.

7. The method of claim 2, wherein the multibridge linking code is assigned to each contact found during the search that has criteria matching the specific data requirement.

8. The method of claim 2, wherein each contact in the hierarchical chain conveys access to the information of the subsequent contact by providing the indication to forward the key or denies access to the information by not providing an indication to forward the key to contact a subsequent contact.

9. The method of claim 2, wherein the key is time-bound.

10. The method of claim 2, wherein the key is at least one of alphanumeric, symbols and icons.

11. The method of claim 2, wherein the key is randomly assigned.

* * * * *